US009752952B2

(12) United States Patent
Poon

(10) Patent No.: US 9,752,952 B2
(45) Date of Patent: Sep. 5, 2017

(54) METHOD FOR INSTALLING A WATER LEAKAGE SYSTEM

(71) Applicant: Yuk Lin Poon, Shau Kei Wan (HK)

(72) Inventor: Yuk Lin Poon, Shau Kei Wan (HK)

( * ) Notice: Subject to any disclaimer, the term of this patent is extended or adjusted under 35 U.S.C. 154(b) by 291 days.

(21) Appl. No.: 14/595,166

(22) Filed: Jan. 12, 2015

(65) Prior Publication Data

US 2016/0202140 A1    Jul. 14, 2016

(51) Int. Cl.
  *G01M 3/16*    (2006.01)
  *H02G 1/00*    (2006.01)
  *H02G 3/00*    (2006.01)

(52) U.S. Cl.
  CPC .............. *G01M 3/16* (2013.01); *H02G 1/00* (2013.01); *H02G 3/00* (2013.01)

(58) Field of Classification Search
  CPC .......... G01M 3/04; G01M 3/045; G01M 3/16; G01M 3/18; H02G 1/00; H02G 3/00
  See application file for complete search history.

(56) References Cited

U.S. PATENT DOCUMENTS

| 5,967,171 A * | 10/1999 | Dwyer, Jr. ............ | D06F 39/081 137/312 |
| 5,992,218 A * | 11/1999 | Tryba ...................... | G01M 3/16 137/312 |
| 6,025,788 A * | 2/2000 | Diduck ................... | G01M 3/18 340/3.4 |
| 6,526,807 B1 * | 3/2003 | Doumit ................... | G01M 3/04 340/605 |
| 7,649,468 B2 * | 1/2010 | Gordon .................. | G08B 21/14 340/620 |
| 2005/0267698 A1 * | 12/2005 | Gordon .................. | G08B 21/14 702/64 |

FOREIGN PATENT DOCUMENTS

JP           2004226157 A *   8/2004

* cited by examiner

Primary Examiner — Carl Arbes

(57) ABSTRACT

According to embodiments of the prevention, a method for installing a water leakage detection system is provided. In one embodiment, a method is provided to identify at least one observation point for each electricity conduit hidden inside in a wall and at least a ceiling of an area. A humidity sensor and a tag reporting data via radio frequency are further provided such that at any given time, moisture of the area associated with the observation point is collected and reported to a circuit breaker that can be configured to terminate the power supply associated with any given observation point.

7 Claims, 5 Drawing Sheets

METHOD FOR INSTALLING A WATER LEAKAGE SYSTEM

FIELD OF THE INVENTION

This invention relates to plumbing. Specifically, the present invention relates to an automated system for detecting water leaks from pipes in a building.

BACKGROUND OF THE INVENTION

Corroded, rusted, or otherwise damaged pipes are prevalent in many buildings, especially those constructed many years ago. Water leaks are a common problem which occurs in many households around the world. Many leaks occur at junctures, valves, or ends of piping circuits. For example, leaks may occur on sinks or toilets. Such leaks are typically easy to detect and repair as the defective parts are exposed and accessible by users.

Some types of leaks are easily correctable; while others may present challenges to many home owners to completely eliminate water leaking as the source of leakage may come from different places, including the ceiling, rooftop, toilet, or kitchen where pipes may be located. There are different types of solutions to detect leakages, including employing infrared technologies or using colored liquid to trace the source of leakage. Typically, in most situations, owners should be partly held responsible for failing to foresee leakages before they happen. In reality, there are many preventive measures that can be adopted by a home owner. For example, during renovation of a home unit, a home unit should be examined thoroughly to identify the areas that may present the highest risks of water leaking. Unfortunately, most property owners have paid too much attention to the artistic aspects of the renovation work without laying good foundations to account for the wear and tear of the building over time.

In view of the foregoing, there is a need for a system and method detecting, fixing, and/or prevent instances of leaky pipes in a building or other dwelling.

SUMMARY OF THE INVENTION

According to embodiments of the prevention, a method for installing a water leakage detection system is provided. In one embodiment, a method is provided to identify at least one observation point for each electricity conduit hidden inside in a wall and at least a ceiling of an area. A humidity sensor and a tag reporting data via radio frequency are further provided such that at any given time, moisture of the area associated with the observation point is collected and reported to a circuit breaker that can be configured to terminate the power supply associated with any given observation point.

In an embodiment of the disclosed technology, a method is used for installing a water leakage detection system during building construction. The method may employ one or more of the following steps not necessarily in the following order: a) receiving a layout of an area, wherein the layout includes distribution of electricity conduits and water pipes throughout the area; b) identifying at least one observation point for each electricity conduit; c) installing a humidity sensor with respect to each observation point for each electricity conduit, wherein the humidity sensor is associated with a radio frequency identification tag such that at any given time moisture of a proximity of the radio frequency identification tag associated with the observation point is collected and reported to a circuit breaker that is configured to terminate a power supply associated with any of the observation point; d) during operation, receiving data from each humidity detector regarding the proximity of each observation point for each electricity conduit; e) for each observation point, computing a value based on the received humidity detector and the proximity of each observation point to determine whether it is necessary to notify the circuit breaker to terminate the power supply; and/or f) in determining whether to notify the circuit breaker, factoring humidity level, proximity of water pipes, and any electrical appliance already plugged into nearby electrical sockets.

At least two observation points for each electricity conduit may be employed and the at least two observation points may be distributed evenly with respect each single electrical conduit. One of the at least two observation points may be located closer to a location of the water pipes.

In a further embodiment, the humidity sensor may have a set of legs for moving the sensor from one end of the electrical conduit to another end of the electrical conduit. Still further, an additional step may be provided of completing the construction work by enclosing the humidity sensor with respect to each observation point for each electricity conduit with cement. The computing of the value may further be based on capacity and utilization of electricity of the nearby electrical conduit. The humidity sensor may be configured to move or crawl along the electrical conduit in order to detect areas of higher humidity.

In another embodiment of the disclosed technology, a system is used for installing a water leakage detection means before construction work is completed in order to prevent electric shock to human beings. The system includes one or more of the following components: a) a layout depicting an area, wherein the layout includes distribution of electricity conduits and water pipes that are hidden inside a wall and a ceiling of the area; b) at least one observation point identified for each electricity conduit; c) a humidity sensor associated with each observation point for each electricity conduit; d) a tag reporting radio frequency data associated with each humidity sensor; and/or e) a circuit breaker for receiving notification from the tag reporting humidity data of an area associated with the observation point at any given time, wherein the circuit breaker is configured to terminate power supply associated with any given observation point, based on determination whether to notify the circuit breaker further wherein humidity level, proximity of water pipes, and any electrical appliance already plugged into nearby electrical sockets are considered.

The system may include at least two observation points for each electricity conduit. The two observation points may be distributed evenly with respect to each single electrical conduit. There may be at least two observation points for each electricity conduit, and one of the at least two observation points may be located closer to where the water pipes are located.

In a further embodiment, the humidity sensor may have a set of legs for moving the sensor from one end of the electrical conduit to another end of the electrical conduit. The computing of the value may be further based on a capacity and utilization of electricity of the nearby electrical conduit. As such, the humidity sensor may be configured to move along the electrical conduit to seek an area of higher humidity.

DETAILED DESCRIPTION

Referring now to the figures, methods and systems are used to detect water leakage from pipes extending throughout a dwelling and prevent damage and/or harm caused to surrounding objects or nearby humans. In one embodiment, a method is provided to identify at least one observation point for each electricity conduit hidden inside in a wall and at least a ceiling of an area. A humidity sensor and a tag reporting data via radio frequency are further provided such that at any given time, moisture of the area associated with the observation point is collected and reported to a circuit breaker that can be configured to terminate the power supply associated with any given observation point.

Figure 1:
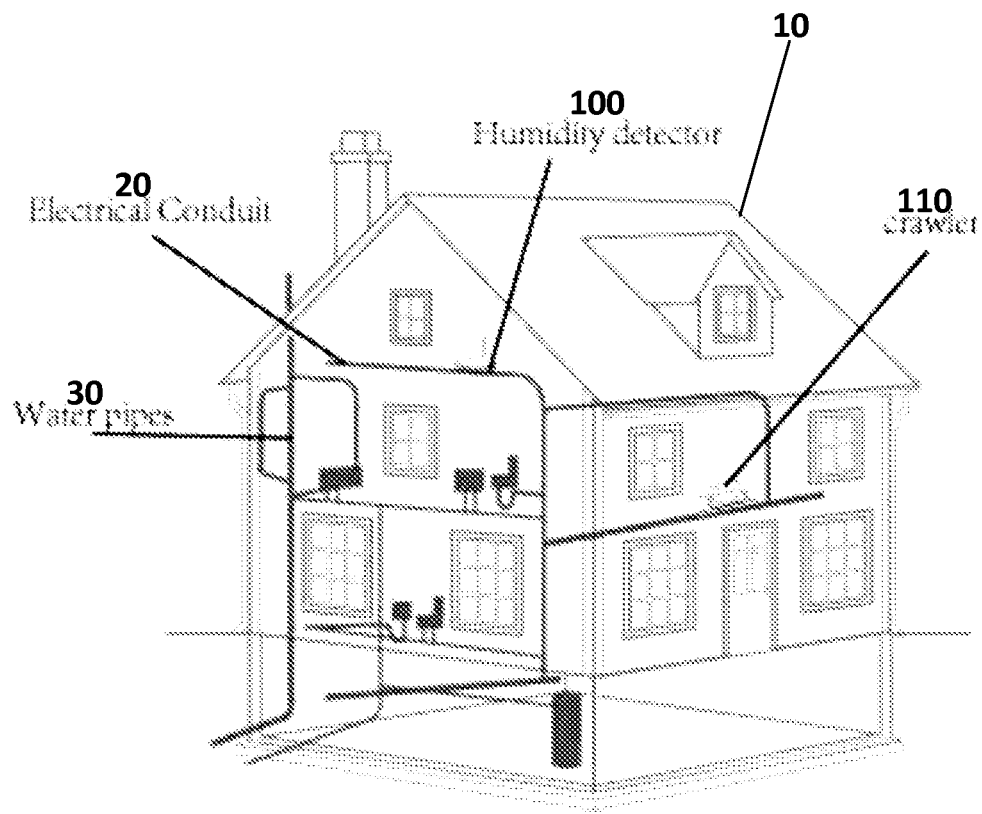
FIG. 1 is an overview of a water line and electrical conduit system running through a home.

Referring now to FIG. 1, an overview of a water line and electrical conduit system running through a home is depicted. The home 10 has circuits of electrical conduit 20 and water pipes 30 extending throughout. In the example shown, humidity detectors 100 are disposed along portions of the electrical conduits 20. Additionally, a crawler 100 is shown moving along a length of conduit, the function of which will be explained in greater detail with respect to FIGS. 2 through 5.

Figure 2:
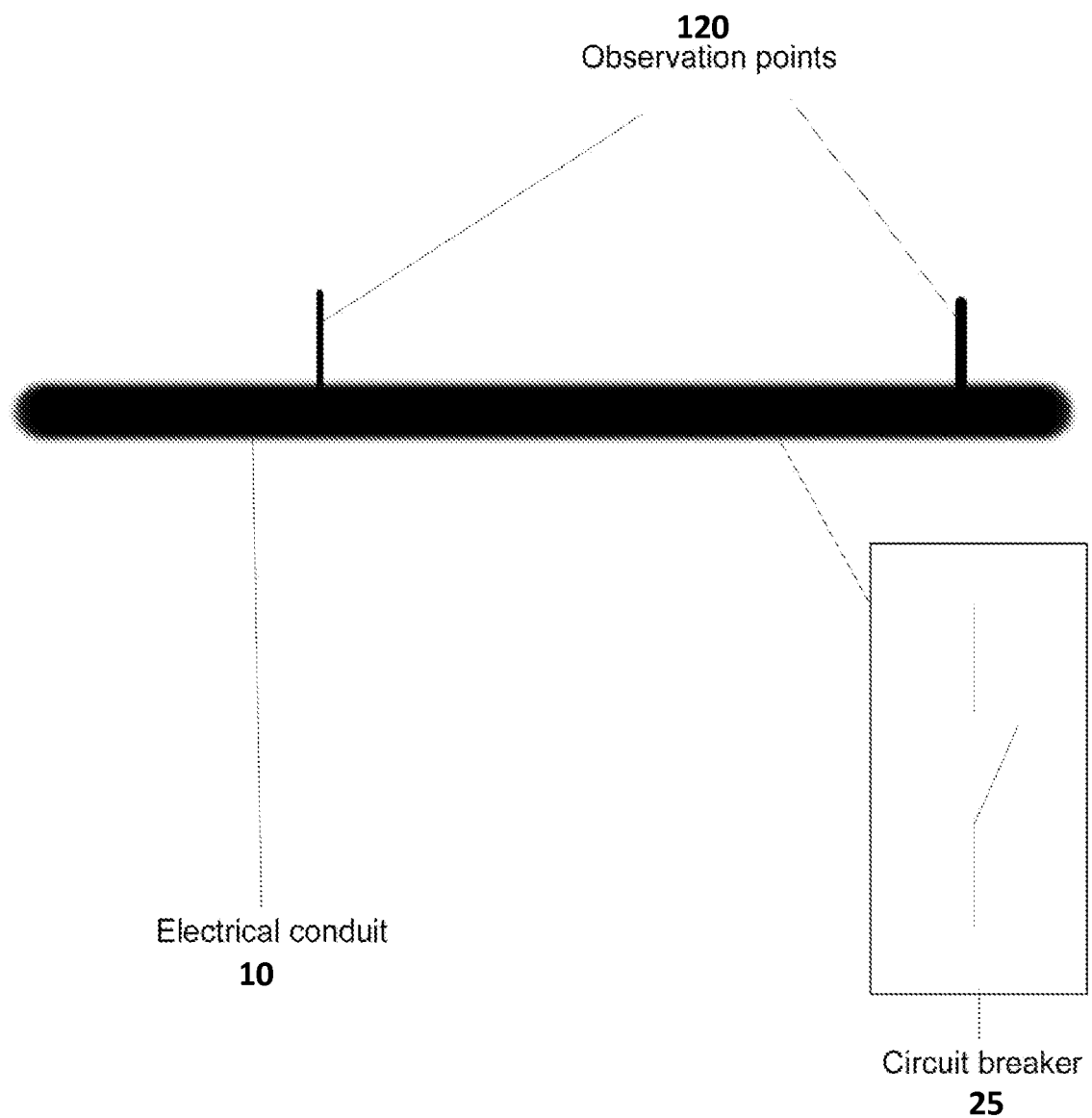
FIG. 2 is a schematic diagram of two observation points along an electrical conduit according to embodiments of the disclosed technology.
Figure 3:
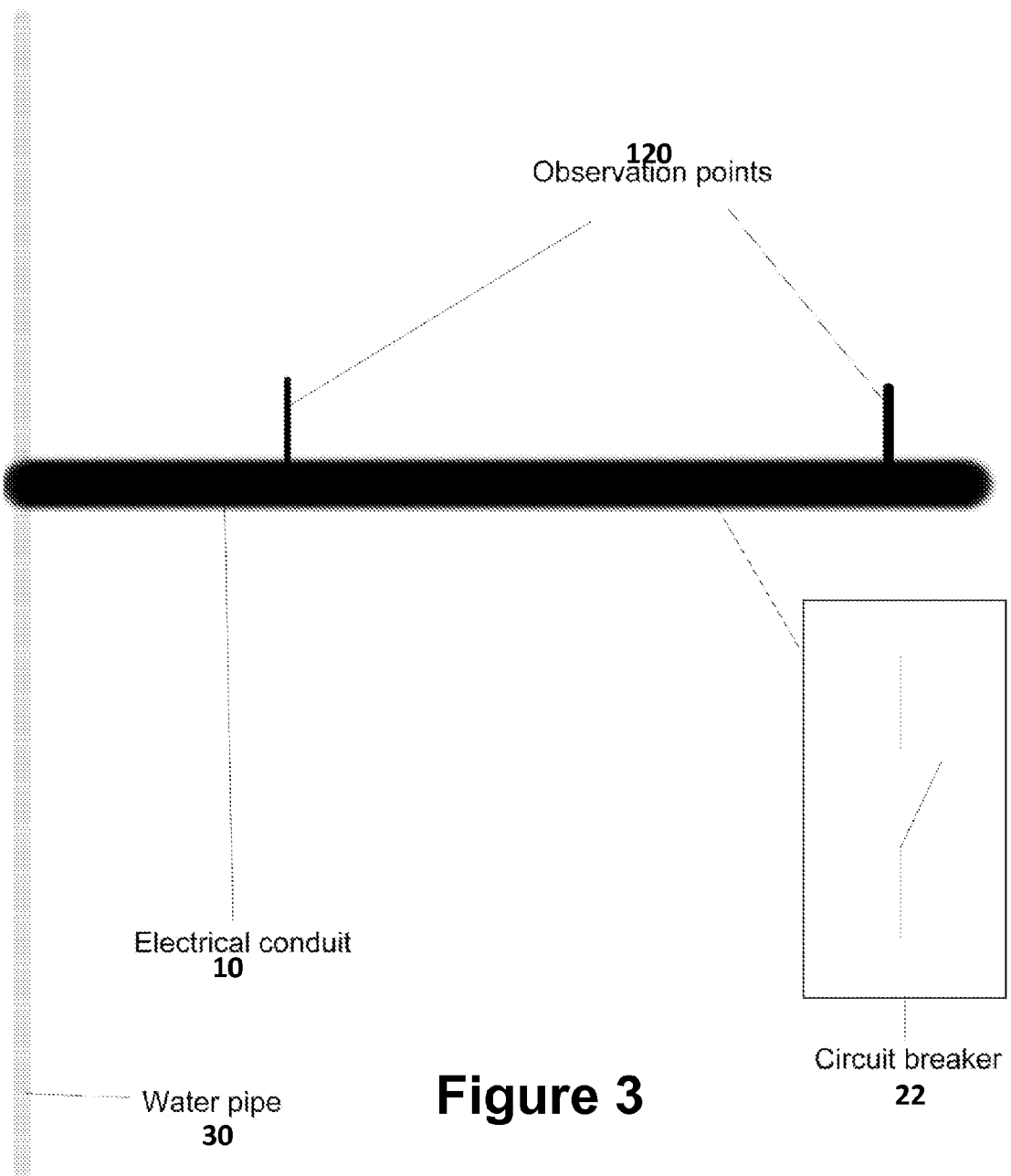
FIG. 3 shows the electrical conduit of FIG. 2 with respect to a water pipe.

FIG. 2 shows a schematic diagram of two observation points along an electrical conduit according to embodiments of the disclosed technology, while FIG. 3 shows the electrical conduit of FIG. 2 with respect to a water pipe. A circuit breaker 25 is additionally shown in electrical communication with the electrical conduit. A method may be employed for installing a water leakage detection system during building construction. The method may employ one or more of the following steps not necessarily in the following order: a) receiving a layout of an area, wherein the layout includes distribution of electricity conduits and water pipes throughout the area; b) identifying at least one observation point for each electricity conduit; c) installing a humidity sensor with respect to each observation point for each electricity conduit, wherein the humidity sensor is associated with a radio frequency identification tag such that at any given time moisture of a proximity of the radio frequency identification tag associated with the observation point is collected and reported to a circuit breaker that is configured to terminate a power supply associated with any of the observation point; d) during operation, receiving data from each humidity detector regarding the proximity of each observation point for each electricity conduit; e) for each observation point, computing a value based on the received humidity detector and the proximity of each observation point to determine whether it is necessary to notify the circuit breaker to terminate the power supply; and/or f) in determining whether to notify the circuit breaker, factoring humidity level, proximity of water pipes, and any electrical appliance already plugged into nearby electrical sockets.

Figure 4:
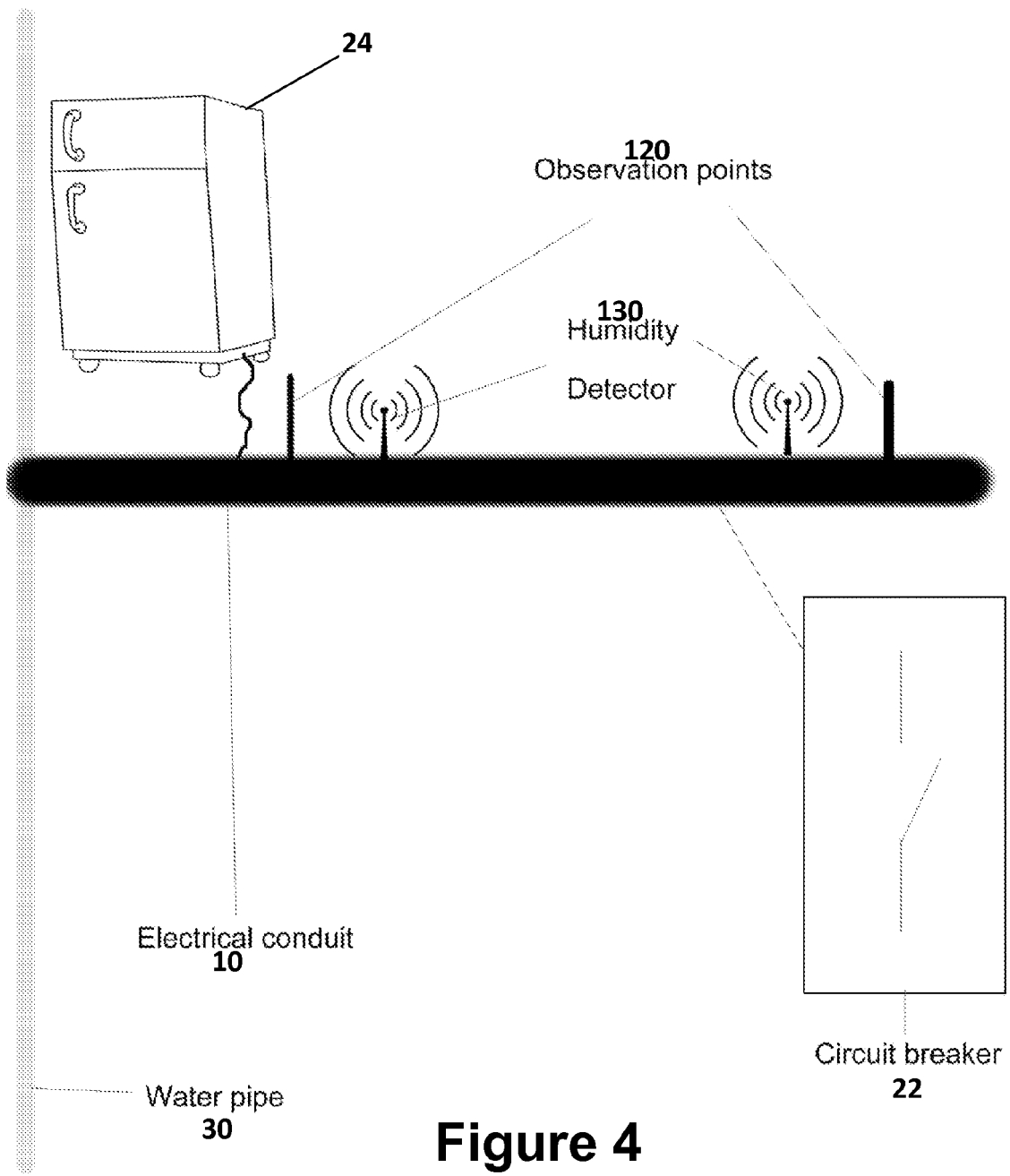
FIG. 4 shows the electrical conduit and water pipe of FIG. 3 with an electrical appliance and humidity detectors installed along the conduit.

FIG. 4 shows the electrical conduit and water pipe of FIG. 3 with an electrical appliance and humidity detectors installed along the conduit. The humidity detectors 130 are disposed along the length of the electrical conduit 10 in close proximity to the observation points. At least two observation points 120 for each electricity conduit may be employed and the at least two observation points may be distributed evenly with respect each single electrical conduit. One of the at least two observation points may be located closer to a location of the water pipes 30. An electrical appliance 24 is also shown in FIG. 4 in close proximity to both the water pipe 30 and the electrical conduit to which it is connected.

In a further embodiment, the humidity sensor may have a set of legs for moving the sensor from one end of the electrical conduit to another end of the electrical conduit. Still further, an additional step may be provided of completing the construction work by enclosing the humidity sensor with respect to each observation point for each electricity conduit with cement. The computing of the value may further be based on capacity and utilization of electricity of the nearby electrical conduit. The humidity sensor may be configured to move or crawl along the electrical conduit in order to detect areas of higher humidity.

In another embodiment of the disclosed technology, a system is used for installing a water leakage detection means before construction work is completed in order to prevent electric shock to human beings. The system includes one or more of the following components: a) a layout depicting an area, wherein the layout includes distribution of electricity conduits and water pipes that are hidden inside a wall and a ceiling of the area; b) at least one observation point identified for each electricity conduit; c) a humidity sensor associated with each observation point for each electricity conduit; d) a tag reporting radio frequency data associated with each humidity sensor; and/or e) a circuit breaker for receiving notification from the tag reporting humidity data of an area associated with the observation point at any given time, wherein the circuit breaker is configured to terminate power supply associated with any given observation point, based on determination whether to notify the circuit breaker further wherein humidity level, proximity of water pipes, and any electrical appliance already plugged into nearby electrical sockets are considered.

The system may include at least two observation points for each electricity conduit. The two observation points may be distributed evenly with respect to each single electrical conduit. There may be at least two observation points for each electricity conduit, and one of the at least two observation points may be located closer to where the water pipes are located.

In a further embodiment, the humidity sensor may have a set of legs for moving the sensor from one end of the electrical conduit to another end of the electrical conduit. The computing of the value may be further based on a capacity and utilization of electricity of the nearby electrical conduit. As such, the humidity sensor may be configured to move along the electrical conduit to seek an area of higher humidity.

In embodiments, a radio frequency identification system is used to detect humidity and send/receive data to observation points and elsewhere. Radio frequency identification ("rfid") tagging is a known method of identification. An information carrying device, or receiver, functions in response to a coded radio frequency (herein "RF") signal transmitted from a base station or reader. The RF carrier signal reflects from the receiver and can be demodulated to recover information stored in the receiver. The receiver typically includes a semiconductor chip having RF circuits, logic, and memory, as well as an antenna. Various receiver structures, circuits, and programming protocols are known in the art.

RF systems typically have three components: (1) a tag or receiver (the item being identified), (2) an interrogator or reader, and (3) a data managing medium (typically including cabling, computers, and software which tie together the tags and interrogators into a useful solution). RF products are typically designed to detect receivers when they pass within a predefined range of the reader.

There are generally two types of RF receivers known in the art: passive RF receivers and active RF receivers. Passive RF receivers, unlike active ones, do not require a battery in order to transmit a RF signal frequency. Instead, passive RF receivers rely on an external source to provoke signal transmission. The RF reader transmits the operating power for these receivers. As a result, such passive RF systems generally have a detection range of limited to a couple meters. However, passive RF receivers may generally be manufactured to be smaller in size than active RF receivers due to the absence of a battery.

Most passive rfid systems work as follows. A reader emits an electromagnetic field for the purpose of powering the receiver. A coil in the receiver is powered by the electromagnetic field, causing the receiver's circuitry to "wake up." The receiver uses this power to send an identifying signal back to the interrogator. Either type of rfid tag may be employed by the present technology.

Figure 5:
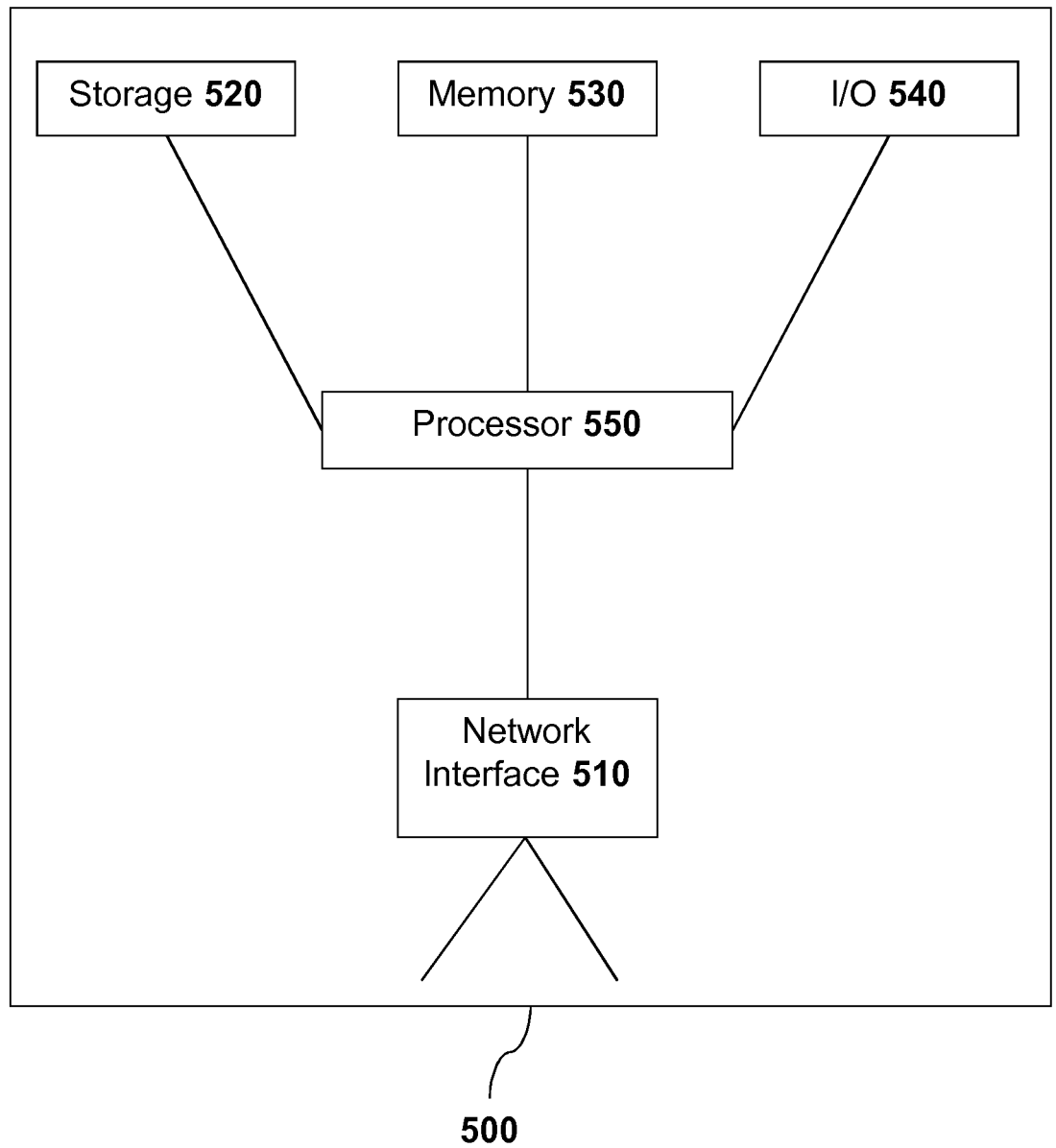
FIG. 5 is a high-level block diagram of a microprocessor device that may be used to carry out the disclosed technology.

FIG. 5 is a high-level block diagram of a microprocessor device that may be used to carry out the disclosed technology. The device 500 comprises a processor 550 that controls the overall operation of a computer by executing the reader's program instructions which define such operation. The reader's program instructions may be stored in a storage device 520 (e.g., magnetic disk, database) and loaded into memory 530 when execution of the console's program instructions is desired. Thus, the device 500 will be defined by the program instructions stored in memory 530 and/or storage 520, and the console will be controlled by processor 550 executing the console's program instructions.

The device 500 may also include one or a plurality of input network interfaces for communicating with other devices via a network (e.g., the internet). The device 500 further includes an electrical input interface for receiving power and data. The device 500 also includes one or more output network interfaces 510 for communicating with other devices. The device 500 may also include input/output 540 representing devices which allow for user interaction with a computer (e.g., display, keyboard, mouse, speakers, buttons, etc.).

One skilled in the art will recognize that an implementation of an actual device will contain other components as well, and that FIG. 3 is a high level representation of some of the components of such a device for illustrative purposes. It should also be understood by one skilled in the art that the method and devices depicted in FIGS. 1, 2a, 2b, and 3 may be implemented on a device such as is shown in FIG. 4.

While the disclosed invention has been taught with specific reference to the above embodiments, a person having ordinary skill in the art will recognize that changes can be made in form and detail without departing from the spirit and the scope of the invention. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

What is claimed:

1. A method for installing a water leakage detection system during building construction, comprising:
   receiving a layout of an area, wherein the layout includes distribution of electricity conduits and water pipes throughout the area;
   identifying at least one observation point for each electricity conduit;
   installing a humidity sensor with respect to each observation point for each electricity conduit, wherein the humidity sensor is associated with a radio frequency identification tag such that at any given time moisture of a proximity of the radio frequency identification tag associated with the observation point is collected and reported to a circuit breaker that is configured to terminate a power supply associated with any of the observation point;
   during operation, receiving data from each humidity detector regarding the proximity of each observation point for each electricity conduit;
   for each observation point, computing a value based on the received humidity detector and the proximity of each observation point to determine whether it is necessary to notify the circuit breaker to terminate the power supply; and
   in determining whether to notify the circuit breaker, factoring humidity level, proximity of water pipes, and any electrical appliance already plugged into nearby electrical sockets.

2. The method of claim 1, wherein at least two observation points for each electricity conduit and the at least two observation points are distributed evenly with respect each single electrical conduit.

3. The method of claim 2, wherein the at least two observation points for each electricity conduit and one of the at least two observation points is located closer to a location of the water pipes.

4. The method of claim 3, wherein the humidity sensor has a set of legs for moving the sensor from one end of the electrical conduit to another end of the electrical conduit.

5. The method of claim 3, further comprising:
   completing the construction work by enclosing the humidity sensor with respect to each observation point for each electricity conduit with cement.

6. The method of claim 1, wherein the computing of the value is further based on capacity and utilization of electricity of the nearby electrical conduit.

7. The method of claim 4, wherein the humidity sensor is configured to move along the electrical conduit detecting areas of higher humidity.

* * * * *